(12) United States Patent
Wendeberg et al.

(10) Patent No.: US 8,540,433 B2
(45) Date of Patent: Sep. 24, 2013

(54) BEARING, AND METHODS OF HANDLING THE BEARING

(75) Inventors: Hans Wendeberg, Västra Frölunda (SE); Håkan Leander, Torslanda (SE)

(73) Assignee: Aktiebolaget SKF, Göteburg (SE)

( * ) Notice: Subject to any disclaimer, the term of this patent is extended or adjusted under 35 U.S.C. 154(b) by 527 days.

(21) Appl. No.: 12/675,914

(22) PCT Filed: Aug. 29, 2008

(86) PCT No.: PCT/SE2008/000485
§ 371 (c)(1),
(2), (4) Date: Mar. 1, 2010

(87) PCT Pub. No.: WO2009/029018
PCT Pub. Date: Mar. 5, 2009

(65) Prior Publication Data
US 2010/0254646 A1    Oct. 7, 2010

(30) Foreign Application Priority Data
Aug. 31, 2007    (SE) ........................ 0701959

(51) Int. Cl.
*F16C 33/58* (2006.01)
*F16C 35/067* (2006.01)

(52) U.S. Cl.
USPC ............ 384/585; 384/510; 384/564; 384/606

(58) Field of Classification Search
USPC ................. 384/398, 477, 510, 538, 540, 556, 384/583–585, 600, 606, 513, 547, 564
See application file for complete search history.

(56) References Cited

U.S. PATENT DOCUMENTS

| | | | | |
|---|---|---|---|---|
| 738,445 | A | * | 9/1903 | Hoffmann ...................... 384/540 |
| 3,807,820 | A | * | 4/1974 | Schuhmann ................... 384/538 |
| 3,953,142 | A | * | 4/1976 | Price et al. ..................... 384/538 |
| 4,452,547 | A | * | 6/1984 | Thiel et al. ..................... 403/370 |
| 5,269,607 | A | * | 12/1993 | Lawson ......................... 384/538 |
| 5,685,650 | A | * | 11/1997 | Martinie et al. ............... 384/585 |
| 6,152,604 | A | * | 11/2000 | Ostling et al. ................. 384/478 |
| 6,375,383 | B1 | * | 4/2002 | Ostling et al. ............... 403/374.3 |
| 6,425,690 | B1 | * | 7/2002 | DeWachter .................... 384/585 |
| 6,491,497 | B1 | * | 12/2002 | Allmon et al. ................ 416/174 |

(Continued)

FOREIGN PATENT DOCUMENTS

| | | |
|---|---|---|
| CN | 1232742 C | 12/2005 |
| EP | 1262678 2 | 12/2002 |

(Continued)

*Primary Examiner* — Marcus Charles
(74) *Attorney, Agent, or Firm* — Mark A. Ussai; Bryan Peckjian

(57) ABSTRACT

A bearing (4) includes an outer ring (6), rolling elements (5) and a two-part inner ring (A). The two-part inner ring (A) includes a first part (1) having a radially outer surface (11) and an inner bore (12). Furthermore, the two-part inner ring (A) includes a second part (2) having a radially inner surface (21) and at least one raceway (22) for rolling elements. The radially outer surface (11) of the first part (1) essentially matches the radially inner surface (21) of the second part (2). A cavity (3), which in use acts as a pressure chamber, is located between the first and second parts (1, 2). When pressurizing the cavity (3), a relative axial movement between the first and second parts (1, 2) is accomplished.

12 Claims, 2 Drawing Sheets

(56) References Cited

U.S. PATENT DOCUMENTS

| | | | |
|---|---|---|---|
| 7,037,026 B2 | 5/2006 | Ostling et al. | |
| 7,305,767 B2 * | 12/2007 | Nisley et al. | 29/898.08 |
| 7,344,313 B2 * | 3/2008 | Hansen et al. | 384/538 |

FOREIGN PATENT DOCUMENTS

| | | |
|---|---|---|
| GB | 1015970 A | 1/1966 |
| GB | 1276547 | 6/1972 |
| GB | 1362253 A | 7/1974 |
| JP | 57059448 B | 12/1982 |
| JP | 63118425 U | 7/1988 |
| JP | 7071466 A | 3/1995 |
| JP | 07229521 A | 8/1995 |
| JP | 08061379 A | 3/1996 |
| SE | 353374 | 1/1973 |

* cited by examiner

BEARING, AND METHODS OF HANDLING THE BEARING

CROSS REFERENCE TO RELATED APPLICATIONS

This application is the U.S. National Stage of International Application No. PCT/SE2008/000485 filed on Aug. 29, 2008, which claims priority to Swedish patent application no. 0701959-9 filed on Aug. 31, 2007, the contents of both of which are incorporated by reference as if fully set forth herein.

FIELD OF THE INVENTION

According to a first aspect, the invention concerns a bearing having a two-part inner ring.

According to a second aspect, the invention concerns a method for mounting a bearing according to the first aspect.

According to a third aspect, the invention concerns a method for dismounting a bearing according to the first aspect.

According to a fourth aspect, the invention concerns a second method for dismounting a bearing according to the first aspect.

According to a fifth aspect of the invention, the invention concerns a method for adjusting a bearing clearance of a bearing according to the first aspect.

BACKGROUND OF THE INVENTION

It is very important that a bearing is installed correctly to realize maximum bearing life. This is important for all bearings, but especially crucial concerning large size bearings. Up to now, there are several methods and designs for mounting and dismounting bearings onto shafts.

Depending on the bearing type and size, mechanical, thermal or hydraulic methods are used for mounting. For instance, when mounting a bearing with a cylindrical bore onto a cylindrical shaft, it is common to heat the bearing in order to increase its inner diameter and then crimp fit the bearing onto the shaft. This procedure may be complicated, expensive and also time consuming. This is the case when using induction heaters, which may be costly and bulky. Furthermore, it is often difficult to dismount such bearings.

There are also bearings with tapered bores. These bearings are often mounted on a tapered seating on the shaft. By driving up the bearing onto the tapered seating, an interference fit is obtained. An advantage with such a mounting is that it is possible to reach the preferred interference fit. On the other hand, a disadvantage may be that it is costly to make the tapered seating. In some applications, a separate sleeve with a tapered seating is used for mounting the bearing. This leads to more complicated handling, since an extra component is used. Furthermore, the size of the bearing application may increase.

Thus, there is a need in certain applications, such as in wind turbines, to be able to mount a bearing with high precision, to have a compact solution and to easily be able to dismount the bearing.

SUMMARY OF THE INVENTION

An object of the invention is to provide a bearing that is easy to mount onto a shaft with a good grip and at the same time provides a compact bearing solution. A second object of the invention is to easily be able to dismount the bearing. A third object of the invention is to be able to dismount the bearing in a controlled manner. A fourth object of the invention is to be able to easily adjust the bearing clearance.

According to the first aspect, the objects are achieved by a bearing comprising an outer ring, rolling elements and a two-part inner ring. The two-part inner ring comprises a first part having a radially outer surface and an inner bore. The radially outer surface has at least two portions of different diameters axially spaced apart. Furthermore, the two-part inner ring comprises a second part having a radially inner surface and at least one raceway for rolling elements. The at least one raceway is located on an outer surface and the radially inner surface has at least two portions of different diameters axially spaced apart. The radially outer surface of the first part essentially matches the radially inner surface of the second part. A cavity, which in use acts as a pressure chamber, is located between the first and second parts, and at least partly within the axial width of the outer ring. In an embodiment, the cavity is within the axial width of the outer ring. The cavity extends at least partly in a circumferential direction. Additionally, the cavity has a first surface on the first part and a second surface on the second part axially spaced apart, and wherein normal vectors of the first and second surfaces have vector components in axial direction, such that when pressurizing the cavity, a relative axial movement between the first and second parts is accomplished. For instance, the two surfaces may be two parallel axially spaced apart surfaces, where the axial vector components are equal to the normal vectors of the surfaces. But it may also be surfaces of different design, such as two relatively angled surfaces axially spaced apart, convex or concave surfaces, or any other surfaces that have axial vector components.

This design of a bearing with a two-part inner ring is advantageous because the hydraulic function for mounting is integrated into the inner ring. This allows a more compact design. Especially, the improved compactness is in the axial dimension. Thus, the axial width of the bearing does not need to be wider than a standard bearing. Furthermore, if the inner bore of the inner ring is cylindrical, it is easy to push the inner ring onto a cylindrical shaft, compared to when using a bearing with a tapered bore and a tapered seating on the shaft. Also, a shaft with a tapered seating may be more expensive to manufacture than a cylindrical shaft. In addition, the invention avoids any grinding and polishing of shafts to precision tolerances, which may be needed when mounting conventional bearings with cylindrical bores. Thus, this invention has the advantages of both a bearing with a cylindrical bore and a bearing with a tapered bore that is mounted onto a tapered seating.

In an embodiment, at least one of the radially outer surface and the radially inner surface of the first and second parts present at least one of an essentially conical shape or a plurality of essentially conical shapes extending in an axial direction. The surfaces may also have other shapes. For instance, it may be in the form of an exponentially increasing surface.

In an embodiment, the bearing further comprises a ring shaped element between the first and second parts, and at least partly within the axial width of the outer ring. In an embodiment, the ring shaped element is within the axial width of the outer ring. Furthermore, the ring shaped element is at an axial end of at least one of the two parts. Also, an axially inner side of the ring shaped element is a surface of the cavity, i.e. the first or second surface of the cavity. The ring shaped element may be attached to either the first or the second part of the two-part inner ring. The ring shaped element may be attached to any of the two parts by welding, a threaded connection, bolts or any other attachment technique.

In an embodiment, the bearing has a sealing element in the cavity at an axial end of the cavity. A seal may be important to use in order to avoid fluid leakage when pressurizing the cavity, since leakage may lead to a decreased performance of the relative axial movement when the cavity is pressurized. The sealing element is in contact with either the first surface or the second surface when the cavity is pressurized.

In an embodiment, the bearing comprises at least one fluid duct having an inlet and an outlet. The fluid duct extends from a surface of any of the first and second parts into the pressure chamber. The fluid duct is meant to lead a fluid medium, preferably oil, into the cavity in order to pressurize it. By this, an axial relative movement between the first and second parts is accomplished.

In an embodiment, the bearing comprises at least one fluid duct having an inlet and an outlet. The fluid duct extends from a surface of any of the first and second parts to at least one contact surface between the radially outer surface and the radially inner surface. By leading a fluid medium to the at least one contact surface, the relative axial movement between the two parts may become easier due to a friction reduction between the parts. Furthermore, the fluid duct may be used to dismount a bearing having the two-part inner ring by pressurizing the duct, and thereby achieve an axial movement between the first and second parts.

In an embodiment, the bearing comprises the fluid duct that extends to the at least one contact surface.

Furthermore, the duct further extends in at least one fluid groove at the at least one contact surface in any or combination of an axial direction of the contact surface or a circumferential direction of the contact surface. By this, the fluid medium will be distributed all around the at least one contact surface, which may lead to a better performance, i.e. decreased friction at the at least one contact surface between the two parts.

In an embodiment, the first part of the two-part inner ring of the bearing has at least one slit extending axially from an axial end of the first part. The slit does not extend at the cavity. By having at least one slit on the first part, it is possible to achieve a better grip on the shaft when pressurizing the cavity in order to mount the bearing. In some situations, it is preferable to have several slits in order to achieve the desired grip.

The bearing may be any type of rolling bearing, such as a spherical roller bearing, a cylindrical roller bearing, a toroidal roller bearing, a ball bearing etc.

According to the second aspect of the invention, the first object of the invention is achieved by a method for mounting a bearing in relation to a shaft, wherein the bearing is the bearing according to the first aspect of the invention. All features of the first aspect is applicable to the second aspect of the invention and vice versa. The normal vectors of the first surface present a component in axial direction and in opposite direction to an axial component of at least one normal vector of the radially outer surface. The method comprises the steps of attaching the bearing onto the shaft, wherein the inner bore is mounted onto an outer peripheral surface of the shaft. Secondly, the bearing is moved to an axial position on the shaft. After that, the cavity is pressurized, which leads to driving up the second part onto the radially outer surface of the first part. This leads to an increase in radial pressure between the first part and the shaft, resulting from the interference fit obtained by the driving up of the second part onto the first part. The contact surface between the two parts may be conical, but it may also have any other shape according to the invention. This mounting procedure is relatively easy to perform compared to other mounting techniques, such as induction heating. Also, this invention makes it possible to mount a bearing with high precision and thereof be able to acquire the preferred bearing clearance. Pressurizing the cavity may be done by connecting a hydraulic tool to the bearing. A pipe may be connected to an inlet of a fluid duct that leads into the cavity. By starting from a low pressure and then continuously increasing the pressure, the second part is finally driven up onto the first part in a controlled manner. While mounting the bearing, it is possible to use different kinds of measuring techniques in order to measure that the bearing is mounted correctly with a good grip on the shaft. For instance, the SKF SensorMount system may be used in order to get the correct interference fit between the shaft and the inner ring of the bearing.

In an embodiment, the inner bore of the first part is cylindrical. Attaching the bearing onto the shaft and moving the bearing to an axial position on the shaft will thus be relatively easy to perform. It is also possible to avoid using precision tolerances of the inner bore and the shaft, since the bearing will be mounted with high precision due to the two-part inner ring. Cylindrical bores are advantageous to use in many different applications. For example, in wind turbine applications, cylindrical bores of bearings is often used. This invention leads to that it is possible to continue to use cylindrical bores with its advantages, and at the same time mount the bearing with a good grip onto the shaft.

According to the third aspect of the invention, the second object of the invention is achieved by a method for dismounting a bearing in relation to a shaft, wherein the bearing is the bearing according to the first aspect of the invention. All features of the third aspect is applicable to the first aspect and vice versa. The inner bore of the first part is attached onto an outer peripheral surface of the shaft, and the normal vectors of the first surface present a component in axial direction and in the same direction as an axial component of at least one normal vector of the radially outer surface. Firstly, the method comprises the step of pressurizing the cavity with a fluid medium in order to obtain a relative axial movement between the first and second parts. The pressure built up in the cavity leads to that axial forces act on the two axially spaced apart surfaces in the cavity, which leads to that the second part is eventually driven off the radially outer surface of the first part. This decreases a radial pressure between the shaft and the first part. The decreased radial pressure leads to that the grip of the bearing on the shaft reduces and the bearing is eventually movable on the shaft. Finally, the bearing is detached from the shaft. The invention provides a dismounting method that is easier to perform than many known dismounting methods. Also, the risk of damaging the bearing or the shaft is reduced compared to when dismounting conventional bearings with a cylindrical shaft.

According to the fourth aspect of the invention, the second object of the invention is achieved by a method for dismounting a bearing in relation to a shaft. The bearing to be dismounted has a two-part inner ring with a fluid duct leading from an outer surface of one of the first and second parts to the contact surface between the first and second parts. All features of the fourth aspect are applicable to the first aspect and vice versa. Furthermore, the inner bore of the first part is attached onto an outer peripheral surface of the shaft. The contact surface between the first and second parts has a specific contact pressure due to an interference fit between the two parts. Firstly, the method comprises the step of pressurizing the fluid duct. This leads to a pressure acting in the contact surface between the first and second parts. The pressure from the fluid duct leads to an axial force that acts in opposite direction of a force resulting from the interference fit. Secondly, the increased pressure leads to that the second part is driven off the first part by an axial movement. It is preferable to start from a low pressure in the fluid duct, and then increase the pressure until the second part starts to move. This method can also be used to adjust the bearing clearance of the bearing. There is a relation between the interference fit between the two parts and the bearing clearance.

In an embodiment, the third object of the invention is achieved. The dismounting method comprises a further step in order to perform the dismounting procedure without the possible risk that the bearing is dismounted in a too rapid and uncontrolled manner. The normal vectors of the first surface present a component in axial direction and in opposite direction to an axial component of at least one normal vector of the radially outer surface. The method further comprises the step of pressurizing the cavity such that an axial force acts on the second part in opposite direction to an axial force acting on the second part resulting from the pressure from the pressurized fluid duct. This leads to that the second part is driven off the first part in a controlled manner. It is possible to start the dismounting procedure by pressurizing the cavity and the fluid duct with equal pressures. When lowering the pressure in the cavity, the second part is eventually driven off the first part in a smooth controlled manner. The pressure of the cavity and the fluid duct may be controlled by a regulator. An input value to the regulator may be an axial force acting on the second part, the movement of the second part on the first part or any other input value that is related to the driving off of the second part. The regulator will make it possible that the driving off of the second part is achieved in a controlled manner. The regulator may for instance be a PD, PI or PID regulator, or other regulators considered suitable by persons skilled in the art. Thus, the method avoids the risk of damaging the bearing and other surrounding components. Also, the method reduces the risk of personal injuries.

According to the fifth aspect of the invention, the fourth object of the invention is achieved by a method for adjusting a bearing clearance. The bearing is a bearing according to the first aspect of the invention. All features of the fifth aspect are applicable to the first aspect of the invention and vice versa. The inner bore of the first part is attached onto an outer peripheral surface of a shaft. The method comprises the step of pressurizing the cavity such that a relative axial movement is accomplished between the first and second parts. The axial movement is accomplished by axial forces resulting from the pressure, wherein the axial forces acts on the two axially spaced apart surfaces. Thereby, the second part is driven to an axial position on the first part, in order to adjust the bearing clearance. In order to reach the preferred bearing clearance, a regulator may be used. This method may be accomplished at the same time as the bearing is being mounted, but it may also be done after the bearing has been mounted. There may be a need to adjust the bearing clearance after the bearing has been running in its application for some time, since wear and other surrounding influence on the bearing may change the bearing clearance.

DETAILED DESCRIPTION OF THE DRAWINGS

It should be understood that some features in the figures are exaggerated in order to clarify the inventive idea.

Figure 1:
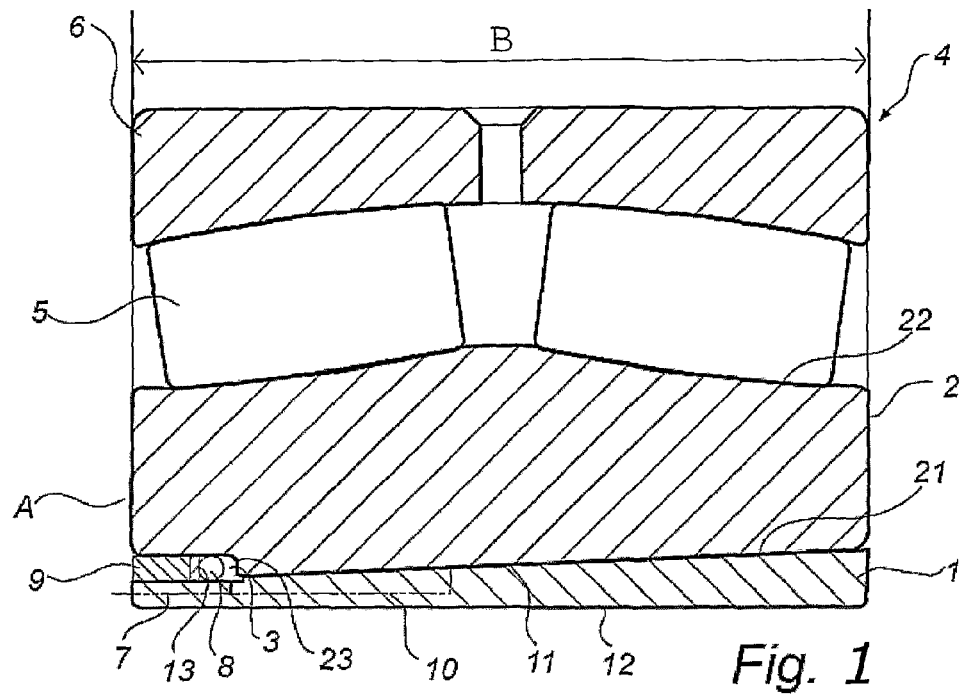
FIG. 1: A cross-section of a bearing according to the invention.

In FIG. 1, a bearing 4 according to the invention is disclosed. The bearing 4 comprises a two-part inner ring A, rolling elements 5, an outer ring 6 and a cage for the rolling elements (not shown in the drawing). The two-part inner ring A comprises a first part 1 and a second part 2. The first part 1 comprises a radially outer surface 11, an inner bore 12 and a first surface 13 of the cavity 3. In this example, the inner bore 12 is cylindrical and the radially outer surface 11 is conical. The second part comprises a radially inner surface 21, an outer raceway 22 and a second surface 23 of the cavity 3. The radially inner surface 21 is also conical and matches the radially outer surface 11. The cavity 3 is within the axial width B of the outer ring 6. Furthermore, the two-part inner ring A has a fluid duct 7 leading from an outer surface of the two-part inner ring A into the cavity 3. In this case, the fluid duct 7 extends from an outer surface of the first part 1 into the cavity 3. The fluid duct 7 is used to pressurize the cavity 3 in order to obtain a relative axial movement between the two parts 1 and 2. In addition, the cavity 3 includes a sealing element 8 for sealing the cavity 3. Further in this example, a ring shaped element 9 is attached to the first part 1, and being inside the axial width B of the outer ring 6. The ring-shaped element 9 may be attached to the first part 1 by any of a weld, a threaded connection, a bolt etc. The ring shaped element 9 may also be attached to the second part 2 in some of the designs according to the invention, see for instance FIGS. 2b and 2c. A fluid duct 10 leading from an outer surface of the two-part inner ring A into a contact surface between the radially outer surface 11 and the radially inner surface 21 is also incorporated. By leading a fluid medium into the contact surface between the two parts 1 and 2, it is possible to reduce the friction generated when a relative movement of the parts 1 and 2 is accomplished. The fluid duct 10 may also be used to dismount the bearing by pressurizing it and thereby accomplish that the second part 2 is driven off the first part 1. The fluid duct 10 may extend into fluid grooves in the contact surface between the two parts 1 and 2. These grooves may extend in a circumferential direction, an axial direction, or both. The inlet of the fluid duct 7 and the inlet of the fluid duct 10 may be the same. This leads to that it is not needed to have as many inlets. Furthermore, it is thus only needed to pressurize the same inlet in order to build up a pressure in the cavity 3 and to lead a fluid medium to the contact surface for friction reduction. In some occasions, it might also be needed to have a fluid duct that leads from the first part to a contact surface between the first part and the shaft. This fluid duct has the same objective as the fluid duct 10, which is mainly meant to be used to reduce friction between two components. When pressurizing the cavity 3 of the bearing, the second part 2 will drive up onto the first part 1, leading to an increase in radial pressure between the two parts 1 and 2. By this, the bearing 4 will be mounted onto a shaft with good precision and the bearing clearance is also easy to adjust. The bearing 4 in this example is a spherical roller bearing, but it may also be any other type of rolling bearing, such as a cylindrical roller bearing, a toroidal roller bearing, a ball bearing etc.

Figure 2A:
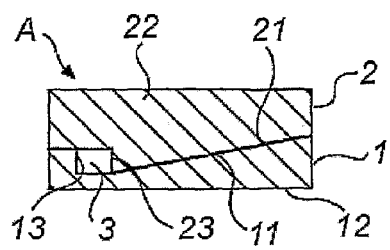
FIG. 2a: A cross-section of a two-part inner ring of the bearing according to the invention.

FIG. 2a shows a cross-section of a two-part inner ring A for the bearing 4 according to the invention. The two-part inner ring A comprises a first part 1 and a second part 2. The first part 1 comprises a radially outer surface 11 and an inner bore 12. The radially outer surface 11 comprises at least two portions of different diameters. In this example, the radially outer surface is in the form of a cone, thus leading to an infinite number of portions of different diameters. The second part 2 comprises a radially inner surface 21 and a raceway 22 for rolling elements located on an outer surface. The radially inner surface 21 presents at least two portions of different diameters. In this example, the radially inner surface 21 is in the shape of a cone. The radially outer surface 11 essentially matches the radially inner surface 21. A cavity 3, which in use acts as a pressure chamber, is located between the first and second parts 1 and 2. The pressure chamber extends at least partly in a circumferential direction of the two-part inner ring A. The cavity has a first surface 13 on the first part 1 and a second surface 23 on the second part 2 axially spaced apart. The normal vectors of the first and second surfaces 13 and 23 have axial vector components, such that when pressurizing the cavity, a relative axial movement between the first and second parts 1 and 2 is accomplished. In this example, the first and second parts 1 and 2 will move axially against each other, leading to driving up the second part 2 onto the first part 1. Furthermore, the first and second surfaces 13 and 23 are parallel and axially spaced apart, which make the axial vector components of the normal vectors equal to the normal vectors.

Figure 2B:
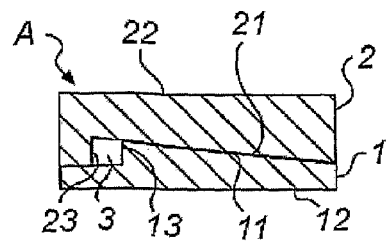
FIG. 2b: A cross-section of a second example of a two-part inner ring of the bearing according to the invention.

FIG. 2b shows another example of a two-part inner ring A of the bearing 4 according to the invention. The first part 1 comprises a radially outer surface 11, an inner bore 12 and a first surface 13 of the cavity 3. The second part 2 comprises a radially inner surface 21, a raceway 22 and a second surface 23 of the cavity 3. In this example, the conical form of the radially outer surface 11 and the radially inner surface 21 is opposite to the conical form in FIG. 2a. Furthermore, the first and second surfaces 13 and 23 of the cavity 3 have changed place compared to in FIG. 2a. This example also leads to that the first and second parts 1 and 2 will move axially against each other when pressurizing the cavity 3, leading to driving up the second part 2 onto the first part 1.

Figure 2C:
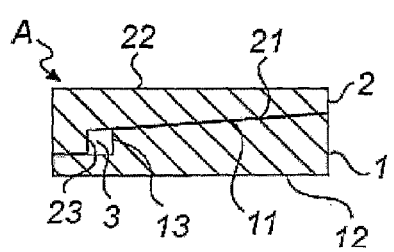
FIG. 2c: A cross-section of a third example of a two-part inner ring of the bearing according to the invention.

In FIG. 2c, a third example of the two-part inner ring A of the bearing 4 according to the invention is disclosed. The first part 1 comprises a radially outer surface 11, an inner bore 12, and a first surface 13 of the cavity 3. The second part 2 comprises a radially inner surface 21, a raceway 22 and a second surface 23 of the cavity 3. The radially outer surface 11 and the radially inner surface 21 present a conical shape that increases in diameter from the cavity 3. Furthermore, the second surface 23 is nearer an axial end of the two-part inner ring A than the first surface 13. This leads to driving off the second part 2 from the first part 1 when pressurizing the cavity 3.

Figure 2D:
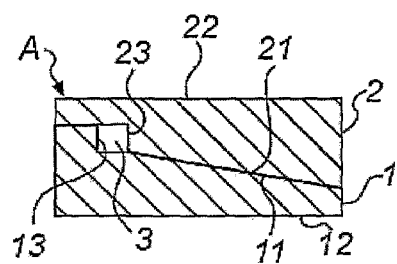
FIG. 2d: A cross-section of a fourth example of a two-part inner ring of the bearing according to the invention.

FIG. 2d shows another example of a two-part inner ring A of the bearing 4 of the invention, which will lead to that the second part 2 will drive off from the first part 1 when pressurizing the cavity 3. The first part 1 comprises a radially outer surface 11, an inner bore 12 and a first surface 13 of the cavity 3. The second part 2 comprises a radially inner surface 21, an outer raceway 22 and a second surface 23 of the cavity 3. In this example, the radially outer surface 11 and the radially inner surface 21 present a conical shape that decreases in diameter from the cavity 3. Furthermore, the first surface 13 is nearer an axial end of the two-part inner ring A than the second surface 23.

Figure 3A:
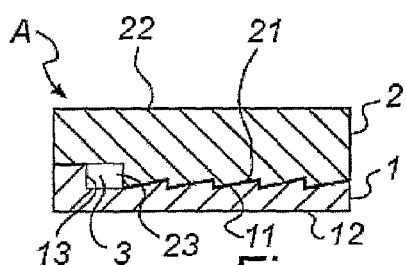
FIG. 3a: A cross-section of a two-part inner ring of the bearing showing a contact surface according to the invention.

FIG. 3a shows another example of a two-part inner ring A of the bearing 4 according to the invention. In this example, the radially outer surface 11 of the first part 1, and the radially inner surface 21 of the second part 2 comprises a contact surface presenting a plurality of cones extending in an axial direction. The first part also comprises an inner bore 12 and a first surface 13 of the cavity 3, and the second part 2 also comprises an outer raceway 22 and a second surface 23 of the cavity 3. This design may lead to a more compact inner ring in the radial direction and also allowing a smaller axial displacement for achieving the desired radial pressure.

Figure 3B:
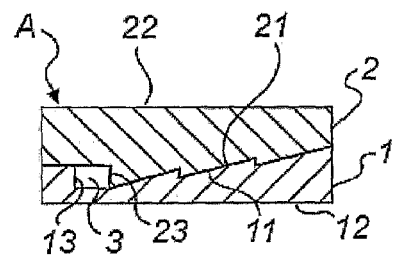
FIG. 3b: A cross-section of a two-part inner ring of the bearing showing a second example of a contact surface according to the invention.

FIG. 3b, another example of a two-part inner ring A of the bearing 4 according to the invention. The radially outer surface 11 and the radially inner surface 21 of the first and second parts 1 and 2 comprise a contact surface presenting a plurality of cones extending in an axial direction. In this example, the mean diameter of each cone increases in the axial direction. The first part also comprises an inner bore 12 and a first surface 13 of the cavity 3, and the second part 2 also comprises an outer raceway 22 and a second surface 23 of the cavity 3.

Figure 3C:
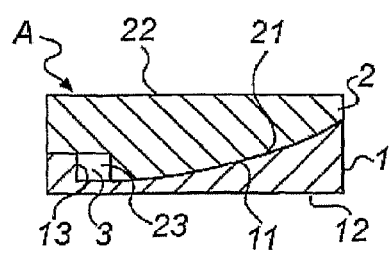
FIG. 3c: A cross-section of a two-part inner ring of the bearing showing a third example of a contact surface according to the invention.

FIG. 3c illustrates another example of a two-part inner ring A of the bearing 4 according to the invention. The radially outer surface 11 and the radially inner surface 21 of the first and second parts 1 and 2 comprise a contact surface that presents an exponentially increasing surface. The first part also comprises an inner bore 12 and a first surface 13 of the cavity 3, and the second part 2 also comprises an outer raceway 22 and a second surface 23 of the cavity 3.

Figure 3D:
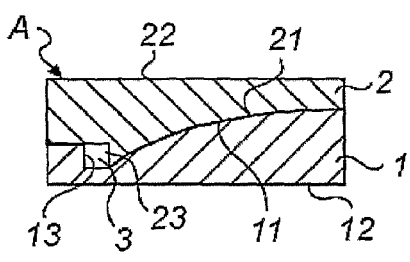
FIG. 3d: A cross-section of a two-part inner ring of the bearing showing a fourth example of a contact surface according to the invention.

In FIG. 3d showing another example of a two-part inner ring A of the bearing 4 according to the invention, the radially outer surface 11 and the radially inner surface 21 of the first and second parts 1 and 2, comprise a contact surface that presents an exponentially decreasing surface. The first part also comprises an inner bore 12 and a first surface 13 of the cavity 3, and the second part 2 also comprises an outer raceway 22 and a second surface 23 of the cavity 3.

Figure 4A:
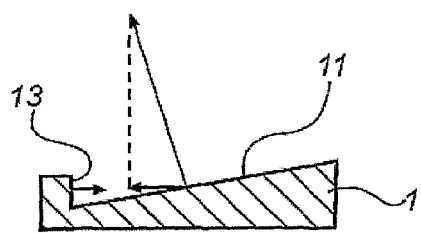
FIG. 4a: A cross-section of a first part of the two-part inner ring of the bearing according to the invention.
Figure 4B:
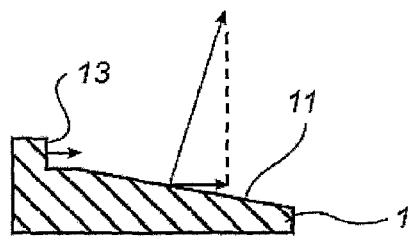
FIG. 4b: A cross-section of a second example of a first part of the two-part inner ring of the bearing according to the invention.

FIGS. 4a and 4b show the principle of how the two-part inner ring A of the bearing 4 according to the invention should be configured in order to accomplish a mounting or a dismounting of a bearing. FIG. 4a shows how the first part 1 should be designed in order to be used for mounting. An axial vector component of a normal vector of the first surface 13 shall be in opposite direction to an axial vector component of a normal vector of the radially outer surface 11. In this example, the axial vector component and its normal vector of the first surface 13 are the same.

FIG. 4b shows the principle of how the first part 1 should be designed in order to accomplish dismounting of a bearing. An axial vector component of a normal of the first surface 13 shall be in the same direction as an axial vector component of a normal vector of the radially outer surface. In this example, the axial vector component and its normal vector of the first surface 13 are the same.

Figure 5:
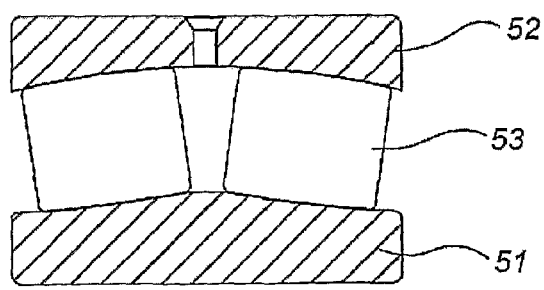
FIG. 5: A cross-section of a conventional rolling bearing.

FIG. 5 illustrates a conventional bearing design. The bearing has an inner ring 51, an outer ring 52 and rolling elements 53. The inner ring 51 has a cylindrical bore. Bearings of this type are often mounted onto a shaft by using induction heaters. In order to mount such a bearing onto a shaft with high precision, very fine tolerances of the shaft is needed. Manufacturing shafts with such tolerances may be expensive.

The invention further comprises a number of methods for handling the bearing. A first method is a method for mounting a bearing in relation to a shaft, wherein the bearing is a bearing according to the invention. The bearing may be configured as the bearing 4 in FIG. 1. The normal vectors of the first surface 13 present a component in axial direction and in opposite direction to an axial component of at least one normal vector of the radially outer surface 11. The method comprises the steps of attaching the bearing 4 onto the shaft, wherein the inner bore 12 is mounted onto an outer peripheral surface of the shaft. Secondly, the bearing is moved to an axial position on the shaft. After that, the cavity 3 is pressurized, which leads to driving up the second part 2 onto the radially outer surface 11 of the first part 1. This leads to an increase in radial pressure between the first part 1 and the shaft, resulting from the interference fit obtained by the driving up of the second part 2 onto the first part 1. The contact surface between the two parts 1 and 2 may be conical, but it may also have any other shape according to the invention. Pressurizing the cavity 3 may be done by connecting a hydraulic tool to the bearing 4. A pipe may be connected to an inlet of the fluid duct 7 that leads into the cavity 3. By starting from a low pressure and then continuously increasing the pressure, the second part 2 is finally driven up onto the first part 1 in a controlled manner. While mounting the bearing 4, it is possible to use different kinds of measuring techniques in order to measure that the bearing 4 is mounted correctly with a good grip on the shaft. For instance, the SKF SensorMount system may be used in order to get the correct interference fit between the shaft and the two-part inner ring A of the bearing 4.

Furthermore, the invention comprises a method for dismounting a bearing in relation to a shaft, wherein the bearing may be a bearing having a two-part inner ring A as in FIG. 2c or 2d. The inner bore 12 of the first part 1 is attached onto an outer peripheral surface of the shaft, and the normal vectors of the first surface 13 present a component in axial direction and in the same direction as an axial component of at least one normal vector of the radially outer surface 11. Firstly, the method comprises the step of pressurizing the cavity 3 with a fluid medium in order to obtain a relative axial movement between the first and second parts 1 and 2. The pressure built up in the cavity 3 leads to that axial forces act on the two axially spaced apart surfaces 13 and 23 in the cavity 3, which leads to that the second part 2 is eventually driven off the radially outer surface 11 of the first part 1. This decreases a radial pressure between the shaft and the first part 1. The decreased radial pressure leads to that the grip of the bearing on the shaft reduces and the bearing is eventually movable on the shaft. Finally, the bearing is detached from the shaft.

The invention also comprises a method for dismounting a bearing in relation to a shaft. The bearing to be dismounted has a two-part inner ring A with a fluid duct 10 leading from an outer surface of one of the first and second parts 1 and 2 to the contact surface between the first and second parts 1 and 2. The bearing may be a bearing as the bearing 4 in FIG. 1. Furthermore, the inner bore 12 of the first part 1 is attached onto an outer peripheral surface of the shaft. The contact surface between the first and second parts 1 and 2 has a specific contact pressure due to an interference fit between the two parts 1 and 2. Firstly, the method comprises the step of pressurizing the fluid duct 10. This leads to a pressure acting in the contact surface between the first and second parts 1 and 2. The pressure from the fluid duct 10 leads to an axial force that acts in opposite direction of a force resulting from the interference fit. Secondly, the increased pressure leads to that the second part 2 is driven off the first part 1 by an axial movement. It is preferable to start from a low pressure in the fluid duct 10, and then increase the pressure until the second part 2 starts to move. This method may also be used to adjust the bearing clearance of the bearing 4. There is a relation between the interference fit between the two parts and the bearing clearance. The bearing may be any type of rolling bearing, such as a spherical roller bearing, a cylindrical roller bearing, a ball bearing etc.

In an embodiment, the dismounting method comprises a further step in order to perform the dismounting procedure with a decreased risk that the bearing 4 is dismounted in a too rapid and uncontrolled manner. The normal vectors of the first surface 13 present a component in axial direction and in opposite direction to an axial component of at least one normal vector of the radially outer surface 11. The method further comprises the step of pressurizing the cavity 3 such that an axial force acts on the second part 2 in opposite direction to an axial force acting on the second part 2 resulting from the pressure from the pressurized fluid duct 10. This leads to that the second part 2 is driven off the first part in a controlled manner. It is possible to start the dismounting procedure by pressurizing the cavity 3 and the fluid duct 10 with equal pressures. When lowering the pressure in the cavity 3, the second part 2 is eventually driven off the first part 1 in a smooth controlled manner. The pressure of the cavity 3 and the fluid duct 10 may be controlled by a regulator. An input value to the regulator may be an axial force acting on the second part 2, the movement of the second part 2 on the first part 1 or any other input value that is related to driving off of the second part 2. The regulator will make it possible that the driving off of the second part 2 is achieved in a controlled manner. The regulator may for instance be a PD, PI or PID regulator, or other regulators considered suitable by persons skilled in the art.

In an embodiment, a pressure controlling device having two output ducts is used; one duct connected to the cavity 3 and another duct connected to the fluid duct 10. An electronic circuit houses a regulator that controls the pressure difference and the magnitude of the pressure of the ducts 7 and 10. The regulator controls the pressure difference. There may be an electronic arrangement arranged to measure the axial force between the two parts 1 and 2, the movement between the parts 1 and 2 or any other relevant measurement, and providing that measurement as an input to the regulator.

In an embodiment, an operator is in charge of pressurizing the cavity 3 and the fluid duct 10 such that the second part 2 is driven off the first part 1. In an embodiment this may be done by an operator handling two pressure valves, one affecting the pressure of the cavity 3 and the other affecting the pressure of the fluid duct 10. By moderating, either by an operator or a regulator, the pressure difference between the pressure in the cavity 3 and the pressure in the fluid duct 10, the dismounting process may be performed in a controlled manner The invention also comprises a method for adjusting a bearing clearance. The bearing may be a bearing as the bearing in FIG. 1, but it may also be any other bearing according to the invention. The inner bore 12 of the first part 1 is attached onto an outer peripheral surface of a shaft. The method comprises the step of pressurizing the cavity 3 such that a relative axial movement is accomplished between the first and second parts 1 and 2. The axial movement is accomplished by axial forces resulting from the pressure, wherein the axial forces acts on the two axially spaced apart surfaces 13 and 23. Thereby, the second part 2 is driven to an axial position on the first part 1, in order to adjust the bearing clearance. In order to reach the preferred bearing clearance, a regulator may be used in a similar manner as in the dismounting method above. This method may be accomplished at the same time as the bearing is being mounted, but it may also be done after the bearing has been mounted. There may be a need to adjust the bearing clearance after the bearing has been running in its application for some time, since wear and other surrounding influence on the bearing may change the bearing clearance.

The invention claimed is:

1. A bearing comprising:
   an outer ring,
   a plurality of rolling elements,
   a two-part inner ring including:
   a first part having a radially outer surface and an inner bore, the radially outer surface having at least two portions of different diameters axially spaced apart,
   a second part having a radially inner surface and at least one raceway for rolling elements, the at least one raceway being located on an outer surface, the radially inner surface having at least two portions of different diameters axially spaced apart and substantially mating with the radially outer surface of the first part,
   a ring shaped element disposed between the first and second parts and at least partly within an axial width of the outer ring and located at an axial end of at least one of the first and second parts; and
   a cavity located between the first and second parts and at least partly within the axial width of the outer ring, the cavity extending at least partly in a circumferential direction and configured to provide a pressure chamber, the cavity being bounded by a first surface on the first part and a second surface on the second part axially spaced apart, and wherein normal vectors of the first and second surfaces have vector components in axial direction, such that when pressurizing the cavity, a relative axial movement between the first and second parts is accomplished.

2. The bearing, according to claim 1, wherein at least one of the radially outer surface of the first part and the radially inner surface of the second part include at least one of: an essentially conical shape, and a plurality of essentially conical shapes extending in an axial direction.

3. The bearing, according to claim 1, wherein the ring shaped element is located at an axial end of at least one of the two parts and an axially inner side of the ring shaped element is partly bounding the cavity.

4. The bearing, according to claim 1, further comprising a sealing element disposed in the cavity at an axial end of the cavity.

5. The bearing, according to claim 1, further comprising at least one fluid duct having an inlet and an outlet, the fluid duct extending from a surface of any of the first and second parts into the pressure chamber.

6. The bearing according to claim 1, further comprising, at least one fluid duct having an inlet and an outlet, the fluid duct extending from a surface of any of the first and second parts to at least one contact surface between the radially outer surface and the radially inner surface.

7. The bearing, according to claim 6, wherein the fluid duct further extends in at least one fluid groove at the at least one contact surface in at least one of an axial direction of the contact surface and a circumferential direction of the contact surface.

8. A method for mounting a bearing to a shaft, comprising the steps of:
   providing a bearing including an outer ring, a plurality of rolling elements, a two-part inner ring including a first part having a radially outer surface and an inner bore, the radially outer surface having at least two portions of different diameters axially spaced apart, a second part having a radially inner surface and at least one raceway for rolling elements, the at least one raceway being located on an outer surface, the radially inner surface having at least two portions of different diameters axially spaced apart and substantially mating with the radially outer surface of the first part;
   disposing a ring shaped element between the first and second parts and at least partly within an axial width of the outer ring with the ring shaped element located at an axial end of at least one of the first and second parts;
   forming a cavity located between the first and second parts and at least partly within the axial width of the outer ring, the cavity extending at least partly in a circumferential direction and configured to provide a pressure chamber, the cavity being bounded by a first surface on the first part and a second surface on the second part axially spaced apart, and wherein normal vectors of the first and second surfaces have vector components in axial direction, such that when pressurizing the cavity, a relative axial movement between the first and second parts is accomplished;
   attaching the bearing onto the shaft, wherein the inner bore is mounted onto an outer peripheral surface of the shaft;
   moving the bearing to an axial position on the shaft; and
   pressurizing the cavity, leading to driving up the second part onto the radially outer surface of the first part.

9. A method for dismounting a bearing, comprising the steps of:
   providing a bearing including an outer ring, a plurality of rolling elements: a two-part inner ring including a first part having a radially outer surface and an inner bore, the radially outer surface having at least two portions of different diameters axially spaced apart, a second part having a radially inner surface and at least one raceway for rolling elements, the at least one raceway being located on an outer surface, the radially inner surface having at least two portions of different diameters axially spaced apart and substantially mating with the radially outer surface of the first part;
   disposing a ring shaped element between the first and second parts and at least partly within an axial width of the outer ring with the ring shaped element located at an axial end of at least one of the first and second parts;
   forming a cavity located between the first and second parts and at least partly within the axial width of the outer ring, the cavity extending at least partly in a circumferential direction and configured to provide a pressure chamber, the cavity being bounded by a first surface on the first part and a second surface on the second part axially spaced apart, and wherein normal vectors of the first and second surfaces have vector components in axial direction, such that when pressurizing the cavity, a relative axial movement between the first and second parts is accomplished, the inner bore being disposed about the shaft;
   pressurizing the cavity with a fluid medium in order to obtain a relative axial movement between the first and second parts, leading to driving off the second part from the radially outer surface of the first part, and thereby decreasing a radial pressure between the shaft and the first part; and detaching the bearing from the shaft.

10. The method according to claim 9:

wherein the bearing further includes at least one fluid duct having an inlet and an outlet, the fluid duct extending from a surface of any of the first and second parts to at least one contact surface between the radially outer surface and the radially inner surface and the inner bore is attached onto an outer peripheral surface of the shaft, and further comprising the step of pressurizing the fluid duct, such that the second part is driven off the first part by an axial movement.

11. The method according to claim 10:

wherein the normal vectors of the first surface present a component in axial direction and in opposite direction to an axial component of at least one normal vector of the radially outer surface, and further comprising the step of pressurizing the cavity such that an axial force acts on the second part in opposite direction to an axial force acting on the second part resulting from the pressure from the pressurized fluid duct such that the second part is driven off the first part in a controlled manner.

12. A method for adjusting a bearing clearance comprising the steps of:

providing a bearing including an outer ring, a plurality of rolling elements;

a two-part inner ring including a first part having a radially outer surface and an inner bore, the radially outer surface having at least two portions of different diameters axially spaced apart, a second part having a radially inner surface and at least one raceway for rolling elements, the at least one raceway being located on an outer surface, the radially inner surface having at least two portions of different diameters axially spaced apart and substantially mating with the radially outer surface of the first part, and disposing a ring shaped element between the first and second parts and at least partly within an axial width of the outer ring with the ring shaped element located at an axial end of at least one of the first and second parts;

forming a cavity located between the first and second parts and at least partly within the axial width of the outer ring, the cavity extending at least partly in a circumferential direction and configured to provide a pressure chamber, the cavity being bounded by a first surface on the first part and a second surface on the second part axially spaced apart, and wherein normal vectors of the first and second surfaces have vector components in axial direction, such that when pressurizing the cavity, a relative axial movement between the first and second parts is accomplished, the inner bore being disposed about an outer peripheral surface of the shaft; and pressurizing the cavity such that a relative axial movement is accomplished, thereby driving the second part to an axial position on the first part, in order to adjust the bearing clearance.

* * * * *